United States Patent
Jang et al.

(10) Patent No.: US 9,727,732 B2
(45) Date of Patent: Aug. 8, 2017

(54) METHOD OF IDENTIFYING SECURITY AND ELECTRONIC DEVICE THEREOF

(71) Applicant: Samsung Electronics Co., Ltd., Gyeonggi-do (KR)

(72) Inventors: Se-Hyeon Jang, Gyeonggi-do (KR); Peng Ning, San Jose, CA (US); Yu-Seung Kim, Seoul (KR); Balakrishna Venkataraman, Santa Clara, CA (US)

(73) Assignee: Samsung Electronics Co., Ltd (KR)

( * ) Notice: Subject to any disclaimer, the term of this patent is extended or adjusted under 35 U.S.C. 154(b) by 246 days.

(21) Appl. No.: 14/459,002

(22) Filed: Aug. 13, 2014

(65) Prior Publication Data
US 2015/0052342 A1  Feb. 19, 2015

(30) Foreign Application Priority Data

Aug. 13, 2013  (KR) .................. 10-2013-0096218

(51) Int. Cl.
*G06F 9/00* (2006.01)
*G06F 21/53* (2013.01)
*G06F 21/57* (2013.01)

(52) U.S. Cl.
CPC ............ *G06F 21/575* (2013.01); *G06F 21/53* (2013.01)

(58) Field of Classification Search
None
See application file for complete search history.

(56) References Cited

U.S. PATENT DOCUMENTS

| 2005/0114616 | A1 | 5/2005 | Tune et al. | |
| 2008/0250217 | A1* | 10/2008 | Kershaw | G06F 12/1483 711/163 |
| 2010/0230490 | A1* | 9/2010 | Guthery | G06F 21/74 235/382 |
| 2013/0097698 | A1* | 4/2013 | Taveau | G06Q 30/06 726/19 |

* cited by examiner

*Primary Examiner* — Paul Yanchus, III
(74) *Attorney, Agent, or Firm* — The Farrell Law Firm, P.C.

(57) ABSTRACT

An apparatus and a method for identifying security of an electronic device are provided. The method includes identifying a security state of a system binary loaded to a memory of the electronic device based on booting of the electronic device in a second operating system of the electronic device, and sending security state information to a first operating system in the second operating system based on a request from the first operating system of the electronic device.

16 Claims, 7 Drawing Sheets

METHOD OF IDENTIFYING SECURITY AND ELECTRONIC DEVICE THEREOF

PRIORITY

This application claims priority under 35 U.S.C. §119(a) to a Korean Patent Application filed on Aug. 13, 2013 in the Korean Intellectual Property Office and assigned Serial No. 10-2013-0096218, the entire contents of which are incorporated herein by reference.

BACKGROUND

1. Field of the Invention

The present disclosure relates generally to an apparatus and a method of identifying security of an electronic device, and more particularly, to an apparatus and a method of enhancing security of an electronic device.

2. Description of the Related Art

Due to advances in information communication technology and semiconductor technology, an electronic device provides various services such as voice call service, messenger service, broadcasting service, and wireless Internet service and is becoming an important tool for information delivery and one of the necessities of modem life.

Recently, the electronic device has provided security for financial transaction services and provided business processing services for a user's convenience. Hence, the electronic device can store security information for providing financial transaction services and business processing services.

A Linux-based electronic device can provide flexibility to allow users to freely modify the system based on the openness of Linux. However, the Linux-based electronic device is also vulnerable to security breaches due to the openness of Linux.

SUMMARY

The present disclosure has been made to address the above-discussed deficiencies of the prior art, and to provide at least the advantages described below. Accordingly, an aspect of the present disclosure is to provide an apparatus and a method of identifying security of an electronic device.

In accordance with an aspect of the present disclosure, a method of identifying security of an electronic device is provided. The method includes identifying a security state of a system binary loaded to a memory of the electronic device based on booting of the electronic device in a second operating system of the electronic device; and sending security state information to a first operating system in the second operating system based on a request from the first operating system of the electronic device.

In accordance with another aspect of the present disclosure, an electronic device is provided. The electronic device includes a memory; and at least one processor configured to drive a plurality of operating systems, wherein the at least one processor is configured to identify a security state of a system binary loaded to a memory of the electronic device based on booting of the electronic device in a second operating system, and to send security state information to a first operating system in the second operating system based on a request from the first operating system.

BRIEF DESCRIPTION OF THE DRAWINGS

The above and other aspects, features, and advantages of the present disclosure will be more apparent from the following description, taken in conjunction with the accompanying drawings, in which.

DETAILED DESCRIPTION OF EMBODIMENTS OF THE PRESENT INVENTION

The following description with reference to the accompanying drawings is provided to assist in a comprehensive understanding of embodiments of the disclosure as defined by the claims and their equivalents, where like reference numerals refer to like parts, components and structures.

The description of the present disclosure includes various details to assist in the understanding of the present disclosure, but these details are to be regarded as mere examples. Accordingly, those of ordinary skill in the art will recognize that various changes and modifications of the embodiments described herein may be made without departing from the scope and spirit of the disclosure. In addition, descriptions of well-known functions and constructions are omitted for clarity and conciseness.

The terms and words used in the following description and claims are not limited to their dictionary, but, are merely used to enable a clear and consistent understanding of the disclosure. Accordingly, it should be apparent to those skilled in the art that the following description of embodiments of the present disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Embodiments of the present disclosure provide a method and apparatus for identifying security of an electronic device.

Hereafter, the electronic device may employ a device having a security function. For example, the electronic device may include one or more of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an Moving Picture Experts Group Audio Layer 3 (MP3) player, a mobile medical appliance, a camera, and a wearable device (e.g., a Head Mounted Display (HMD) such as electronic glasses, an e-textile, an electronic bracelet, an electronic necklace, an electronic accessory, or a smart watch).

The electronic device may employ a smart home appliance having a security function. The smart home appliance may include one or more of, for example, a television (TV), a Digital Video Disc (DVD) player, an audio system, a refrigerator, an air conditioner, a vacuum cleaner, an oven, a microwave oven, a washing machine, an air purifier, a set-top box, a TV box (e.g., Samsung HomeSync™, AppleTV™, or Google TV™), a game console, an electronic dictionary, a digital key, a camcorder, and a digital frame.

The electronic device may also include one or more of medical appliances (e.g., Magnetic Resonance Angiography (MRA), Magnetic Resonance Imaging (MRI), Computed Tomography (CT), X-ray, ultrasonicator), a navigation device, a Global Positioning System (GPS) receiver, an Event Data Recorder (EDR), a Flight Data Recorder (FDR), an in-vehicle infotainment, a marine electronic equipment (e.g., marine navigation device and gyro compass), avionics, and a security device.

The electronic device may also include one or more of a part of furniture or a building/structure having the security function, an electronic board, an electronic signature receiving device, a projector, and a gauge (e.g., water meter, electricity meter, gas meter, or radio signal meter). The electronic device may include one or more of these various devices. Notably, one skilled in the art would understand that the electronic device is not limited to those devices.

Figure 1:
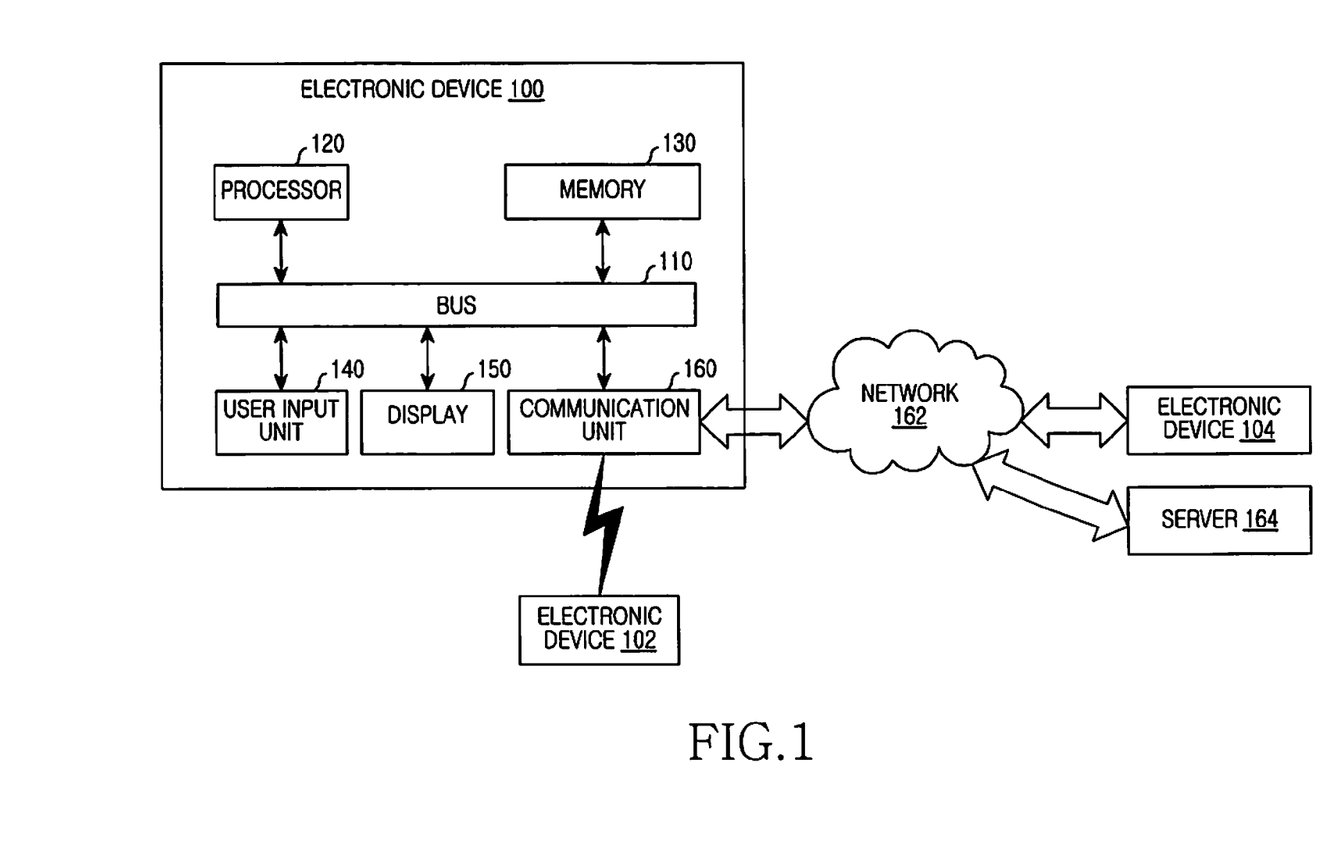
FIG. 1 is a block diagram of an electronic device according to an embodiment of the present disclosure.

FIG. 1 is a block diagram of an electronic device according to an embodiment of the present disclosure.

Referring to FIG. 1, the electronic device 100 includes a bus 110, a processor 120, a memory 130, a user input unit 140, a display 150, and a communication unit 160. The electronic device may include a plurality of one or more of the processor 120 and the memory 130.

The bus 110 may connect the components of the electronic device 100 and control communication between the components of the electronic device 100.

The processor 120 may control the electronic device 100 to provide various services. For example, the processor 120 may translate an instruction received from one or more components (e.g., the memory 130, the user input unit 140, the display 150, and the communication unit 160) of the electronic device 100 via the bus 110, and process an operation or data according to the translated instruction.

The processor 120 may control a user interface service by running a first operating system stored in the memory 130. To process an operation and data relating to security during the user interface service using the first operating system, the processor 120 may process the operation and the data relating to security using a second operating system stored in the memory 130. For example, when the electronic device 100 is booted, the processor 120 may identify one or more of a system binary according to the booting of the electronic device 100 and service accessibility setting via a kernel using the second operating system. Upon identifying the system binary, the processor 120 may generate and store in the memory 130, a hash value of the system binary identified using the second operating system. The system binary may include a boot binary and a kernel binary. The service accessibility setting via the kernel can indicate whether the service access via the kernel is limited as in Security-Enhanced (SE) Linux.

For example, when an application program requiring security management is installed, the processor 120 may send a request signal for installing the application program to an external server using the first operating system. When receiving a state information request signal of the electronic device 100 from the external server in the first operating system, the processor 120 may encrypt security state information of the electronic device 100 identified in the second operating system and send it to the external server using the first operating system. When the external server grants the installation of the application program, the processor 120 may install the application program requiring the security management using the first operating system. The security state information of the electronic device 100 may include one or more of the system binary identified during booting, a security state variable of the electronic device 100, and state information of the kernel binary periodically identified. Thus, the security state variable of the electronic device 100 may indicate the security state of the electronic device 100 according to one or more of the system binary based on the booting of the electronic device 100 and the service accessibility setting via the kernel.

For example, when the application program executed in the first operating system requests to store a private key, the processor 120 may store the private key of the application program using the second operating system. When the application program requests the private key, the processor 120 may selectively provide the private key of the application program according to the security state of the electronic device 100. For example, if no change to the system binary of the electronic device 100 is identified, the processor 120 may provide the private key of the application program in the first operating system. By contrast, if a change to the system binary of the electronic device 100 is identified, the processor 120 may restrict the private key transmission of the application program. In so doing, the processor 120 may identify a change of the system binary of the electronic device 100 based on one or more of the system binary identified during booting of the electronic device 100 and the kernel binary state information periodically identified. The private key may indicate an encryption key used for the security function in the application program. For example, the private key may include one or more of a preset encryption key and a cipher input from the user.

The memory 130 may store an instruction or data received from or generated by one or more components (e.g., the processor 120, the user input unit 140, the display 150, and the communication unit 160) of the electronic device 100. For example, the memory 130 may store a hash value of a reference system binary and the hash value of the system binary identified by the processor 120 during booting of the electronic device 100. The reference system binary is set to determine whether the security of the electronic device 100 is compromised (i.e., hacked), during fabrication of the electronic device 100, and can be updated through a firmware update.

The memory 130 may include a first operating system for controlling the user interface service, and a second operating system for controlling the security of the electronic device 100. Thus, the memory 130 may be physically or logically divided into an area for storing instructions or data for the first operating system, and an area for storing instructions or data for the second operating system. Hence, the area for the second operating system of the memory 130 may restrict the first operating system from accessing the area for the second operating system. For example, the first operating system can include programming modules such as kernel, middleware, Application Programming Interface (API), and application. The first operating system may be referred to as a normal world (or unsecure world), and the second operating system may be referred to as a secure world. When the storage area of the first operating system and the storage area of the second operating system are physically divided, the storage area of the first operating system and the storage area of the second operating system of the memory 130 are separated into different integrated circuits or chips.

The user input unit 140 may send an instruction or a data generated by a user's selection to the processor 120 or the memory 130 via the bus 110.

The display 150 may display an image, a video, or data to the user.

The communication unit 160 may facilitate communication between one or more other electronic devices 102 and 104, a server 164, or one or more peripheral devices, and the electronic device 100. The communication unit 160 may support a short-range communication protocol (e.g., Wireless Fidelity (Wi-Fi), Bluetooth (BT), Near Field Communication (NFC)), or the network 162 (e.g., Internet, Local Area Network (LAN), Wide Area Network (WAN), telecommunication network, cellular network, satellite network, or Plain Old Telephone Service (POTS)). The other electronic devices 102 and 104, which are peripheral devices of the electronic device 100, may be the same as or different from the electronic device 100 in type.

Figure 2:
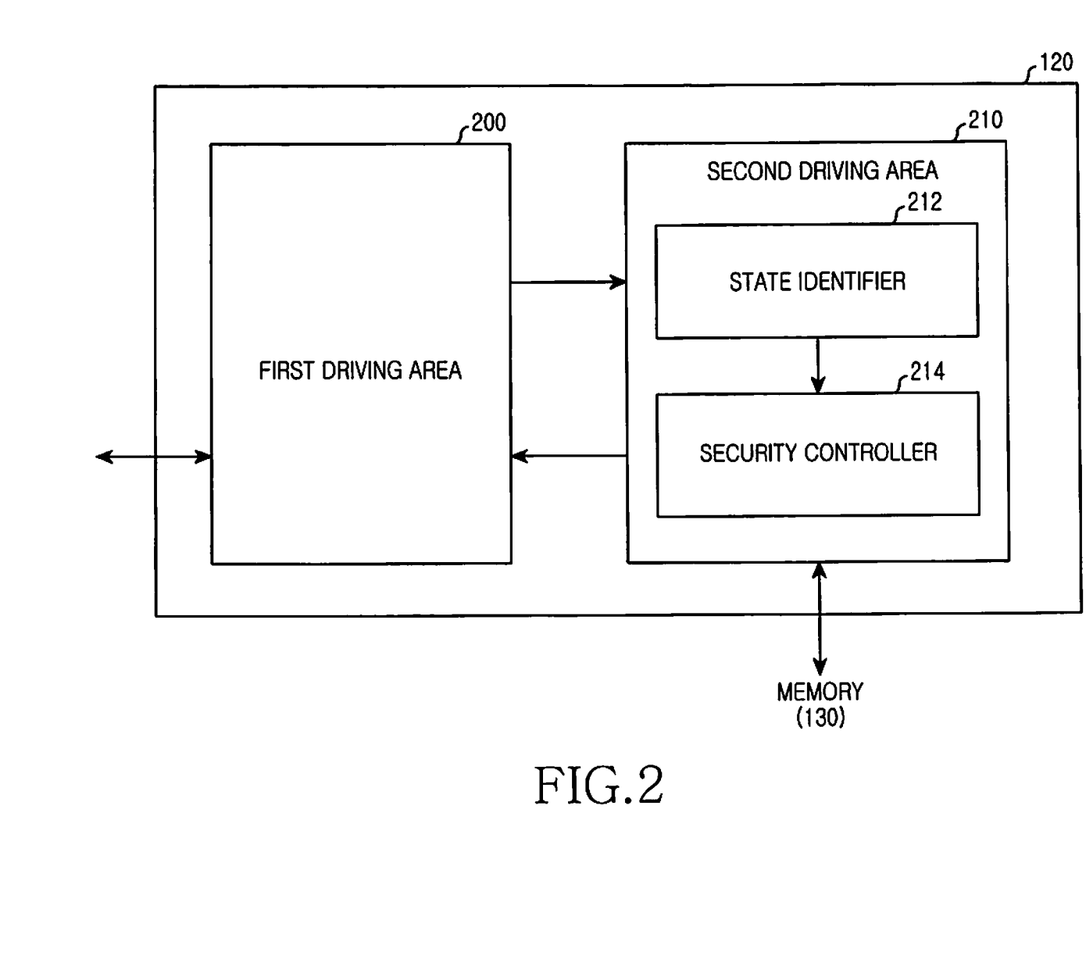
FIG. 2 is a block diagram of a processor according to an embodiment of the present disclosure.

FIG. 2 is a block diagram of the processor 120 according to an embodiment of the present disclosure.

Referring to FIG. 2, the processor 120 includes a first driving area 200 and a second driving area 210.

The first driving area 200 may control the user interface service by running a first operating system stored in the memory 130. Thus, the first driving area 200 may be referred to as a normal area (or an unsecure area). For example, when the application program requiring the security management is installed, the first driving area 200 may request installation of the application program from the external server 164 through the communication unit 160. When receiving the security state information request signal of the electronic device 100 from the external server 164, the first driving area 200 may request the security state information of the electronic device 100 from the second driving area 210. When receiving the security state information of the electronic device 100 from the second driving area 210, the first driving area 200 may send the security state information of the electronic device 100 to the external server 164 through the communication unit 160. When receiving the application program installation grant information from the external server, the first driving area 200 may install the application program requiring the security management using the first operating system.

For example, the first driving area 200 may request the second driving area 210 to store the private key of the application program requiring the security management. When the application program requiring the security management needs the private key, the first driving area 200 may request the private key of the application program from the second driving area 210.

The second driving area 210 may process the operation and the data relating to security by running the second operating system stored in the memory 130. The second driving area 210 may be referred to as the security area. For example, the second driving area 210 may include a state identifier 212 and a security controller 214.

The state identifier 212 may identify a variable for determining the security state of the electronic device 100. For example, when the electronic device 100 is booted, the state identifier 212 may identify one or more of the system binary according to the booting of the electronic device 100 and the service accessibility setting via the kernel. When identifying the system binary, the second driving area 210 may generate and store in the memory 130 the hash value of the system binary of the electronic device 100. For example, the state identifier 212 may identify the kernel binary on a periodic basis.

The security controller 214 may control the operation of the first driving area 200 according to the security state of the electronic device 100. For example, when receiving the state information request signal of the electronic device 100 from the first driving area 200, the security controller 214 may encrypt and send the security state information of the electronic device 100 to the first driving area 200. The security state information of the electronic device 100 may include one or more of the system binary identified by the processor 120 during booting, the security state variable of the electronic device 100, and state information of the kernel binary periodically identified. Thus, the security state variable of the electronic device 100 may indicate the security state of the electronic device 100 according to one or more of the system binary based on the booting of the electronic device 100 and the service accessibility setting via the kernel.

For example, when the application program requiring the security management requests to store the private key in the first driving area 200, the security controller 214 may store the private key of the application program in the memory 130. When the first driving area 200 requests the private key of the application program, the security controller 214 may selectively send the private key of the application program according to the security state of the electronic device 100. For example, if no change to the system binary of the electronic device 100 is identified, the security controller 214 may provide the private key of the application program to the first driving area 200. By contrast, if a change of the system binary of the electronic device 100 is identified, the security controller 214 may restrict transmission of the private key of the application program. Thus, the processor 120 may identify the change of the system binary of the electronic device 100 based on one or more of the system binary identified during booting of the electronic device 100 and the kernel binary state information periodically identified.

As above, the processor 120 may be logically divided into the first driving area 200 for running the first operating system and the second driving area 210 for running the second operating system.

Alternatively, the processor 120 may be physically divided into the first driving area 200 for running the first operating system and the second driving area 210 for running the second operating system.

Figure 3:
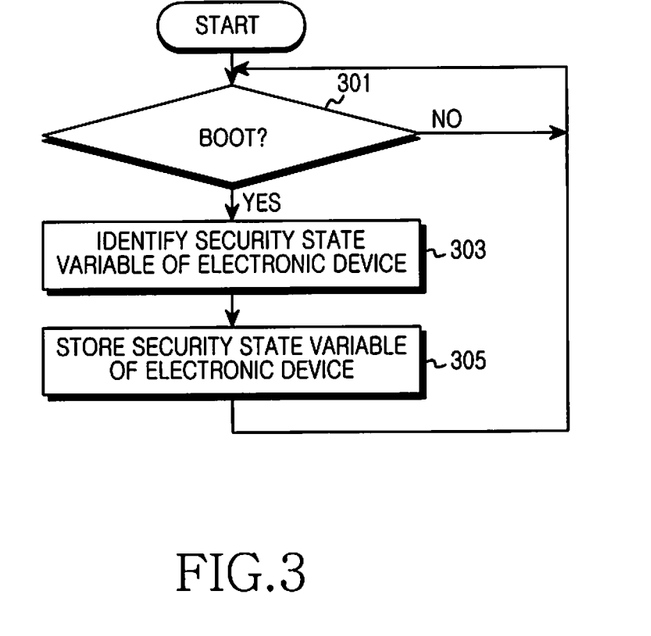
FIG. 3 illustrates a method for identifying state information of a driving area for a user interface service in a security area of an electronic device according to an embodiment of the present disclosure.

FIG. 3 illustrates a method for identifying the state information of the normal area for the user interface service in the security area of the electronic device 100 according to an embodiment of the present disclosure.

Referring to FIG. 3, the electronic device 100 may determine whether the electronic device 100 is booted in the second driving area 210 in step 301.

When the electronic device 100 is booted, the electronic device 100 may identify its security state variable through the second driving area 210 in step 303. For example, the second driving area 210 of the electronic device 100 may identify one or more of the system binary identified during booting of the electronic device 100 and the service accessibility setting via the kernel. For example, the second driving area 210 of the electronic device 100 may identify binaries of sub-bootloaders of bootloaders being part of the system binary according to the booting of the electronic device 100. The system binary may include the boot binary and the kernel binary. The service accessibility setting via the kernel may indicate whether the service access via the kernel is limited as in the SE Linux.

In step 305, the electronic device 100 may store its security state variable in the memory 130 through the second driving area 210. For example, the electronic device 100 may generate and store in the memory 130 a hash value of the system binary.

Figure 4:
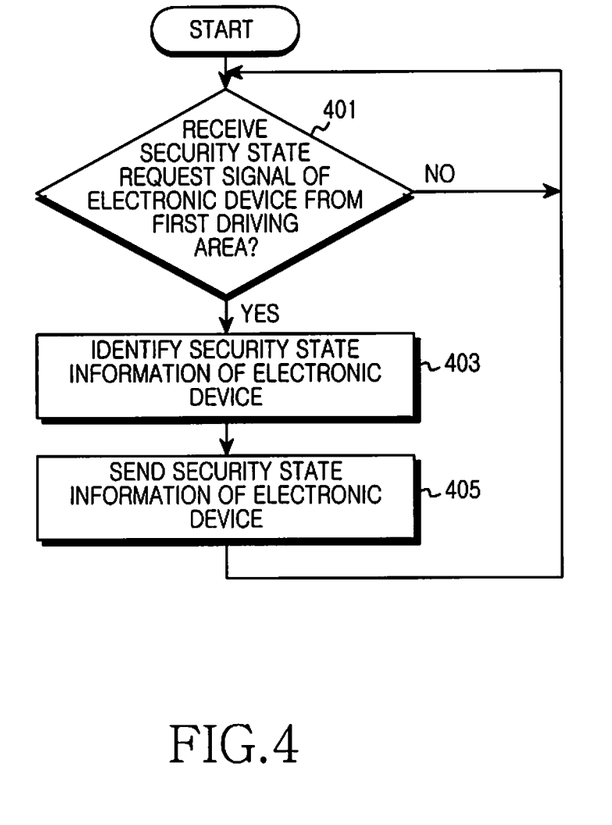
FIG. 4 illustrates a method for sending state information of a normal area for the user interface service in a security area of an electronic device according to an embodiment of the present disclosure.

FIG. 4 illustrates a method for sending the state information of the driving area for the user interface service in the security area of the electronic device 100 according to an embodiment of the present disclosure.

Referring to FIG. 4, the electronic device 100 may determine whether its security state request signal is received from the first driving area 200 through the second driving area 210 in step 401.

When receiving the security state request signal of the electronic device 100, the electronic device 100 may identify its security state information in the second driving area 210 in step 403. For example, the second driving area 210 of the electronic device 100 may identify the system binary measured at the booting of the electronic device 100. For example, the second driving area 210 of the electronic device 100 may identify its security state variable according to one or more of the system binary measured during booting of the electronic device 100 and the service accessibility setting via the kernel. For example, when the system binary measured during booting of the electronic device 100 is different from the reference system binary or when the service accessibility setting via the kernel is not set, the security state variable of the electronic device 100 may be set to attestation failure. For example, the second driving area 210 may identify the kernel binary.

In step 405, the electronic device 100 may encrypt its security state information in the second driving area 210 and send it to the first driving area 200.

Figure 5:
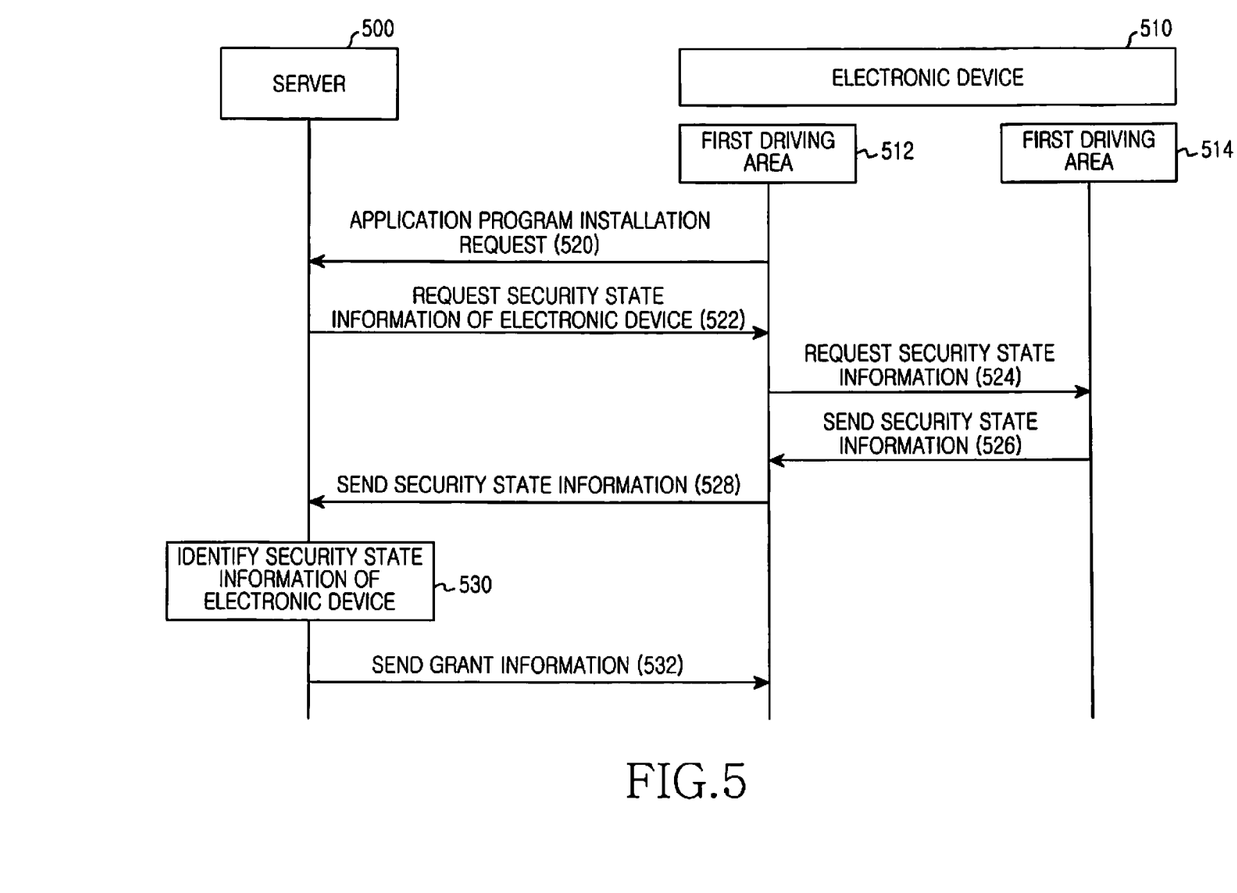
FIG. 5 illustrates a method for determining whether to install an application program in an electronic device according to an embodiment of the present disclosure.

FIG. 5 illustrates a method for determining whether to install an application program in the electronic device 100 according to an embodiment of the present disclosure.

Referring to FIG. 5, when the application program requiring the security management must be installed, a first driving area 512 of an electronic device 510 may request the application program installation from a server 500 in step 520.

According to the application program installation request of the electronic device 510, the server 500 may request the security state information of the electronic device 510 in step 522.

Upon receiving the security state information request of the electronic device 510 from the server 500, the first driving area 512 of the electronic device 510 may request the security state information of the electronic device 510 from a second driving area 514 in step 524.

The second driving area 514 of the electronic device 510 may identify the security state information of the electronic device 510 according to the request of the first driving area 512 and send it to the first driving area 512 in step 526. Thus, the second driving area 514 may encrypt and send the security state information of the electronic device 510 to the first driving area 512. For example, the second driving area 514 may identify the system binary measured during booting of the electronic device 510. For example, the second driving area 514 may identify its security state variable according to one or more of the system binary measured at the booting of the electronic device 510 and the service accessibility setting via the kernel. For example, when the system binary measured during booting of the electronic device 510 is different from the reference system binary or when the service accessibility setting via the kernel is not set, the security state variable of the electronic device 510 may be set to the attestation failure. For example, the second driving area 514 may identify the kernel binary.

The first driving area 512 of the electronic device 510 may send to the server 500 the encrypted security state information of the electronic device 510 provided from the second riving area 514 in step 528.

Based on the security state information received from the electronic device 510, the server 500 may determine whether to grant the installation of the application program requiring the security management in step 530. For example, when identifying integrity of the electronic device 510 based on the security state information received from the electronic device 510, the server 500 may grant the installation of the application program requiring the security management.

The server 500 may send the application program installation grant to the electronic device 510 in step 532.

When the server 500 grants the application program installation, the first driving area 512 of the electronic device 510 may install the corresponding application program.

Figure 6:
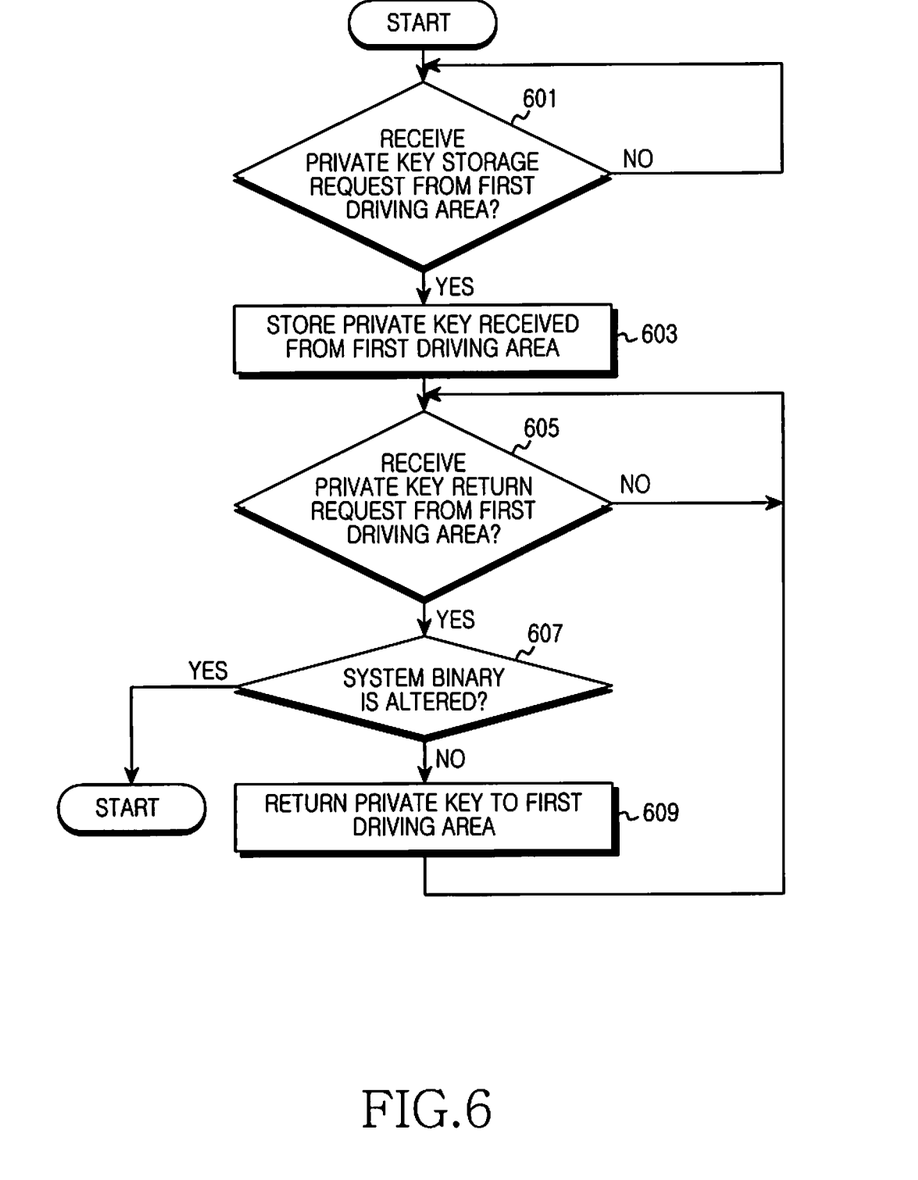
FIG. 6 illustrates a method for managing a private key in a security area of an electronic device according to an embodiment of the present disclosure.

FIG. 6 illustrates a method for managing the private key in the security area of the electronic device 100 according to an embodiment of the present disclosure.

Referring to FIG. 6, the electronic device 100 may determine whether a private key storage request is received from the first driving area 200 through the second driving area 210 in step 601. For example, the second driving area 210 of the electronic device 100 may determine whether a private key storage request signal for the application program requiring the security management is received from the first driving area 200.

Upon receiving the private key storage request from the first driving area 200, the electronic device 100 may store in the memory 130 the private key of the application program received from the first driving area 200 through the second driving area 210 in step 603. Thus, the second driving area 210 of the electronic device 100 may store the private key of the application program received from the first driving area 200, in an area accessible only by the second driving area 210 of the memory 130.

In step 605, the electronic device 100 may determine whether a private key return request is received from the first driving area 200 through the second driving area 210.

If the private key return request from the first driving area 200 is not received, the electronic device 100 may re-determine whether the private key return request is received from the first driving area 200 through the second driving area 210.

Upon receiving the private key return request from the first driving area 200, the electronic device 100 may determine whether the system binary is altered, through the second driving area 210 in step 607. For example, the second driving area 210 of the electronic device 100 may determine whether the system binary is altered by comparing the system binary measured at the booting of the electronic device 100 with the reference system binary. When the hash value of the system binary measured at the booting of the electronic device 100 is different from the hash value of the reference system binary, the second driving area 210 of the electronic device 100 may recognize that the system binary is altered. The reference system binary is set to determine whether the security of the electronic device 100 is compromised (i.e., hacked), at the fabrication of the electronic device 100, and can be updated through a firmware update.

When the system binary is altered, the electronic device 100 may recognize in the second driving area 210 that the electronic device 100 is hacked. Thus, the second driving area 210 of the electronic device 100 may finish this process without returning the private key requested by the first driving area 200.

When the system binary is not altered, the electronic device 100 may recognize in the second driving area 210 that the electronic device 100 is not hacked. Thus, the electronic device 100 may return the private key of the application program requested by the first driving area 200, to the first driving area 200 through the second driving area 210 in step 609.

Figure 7:
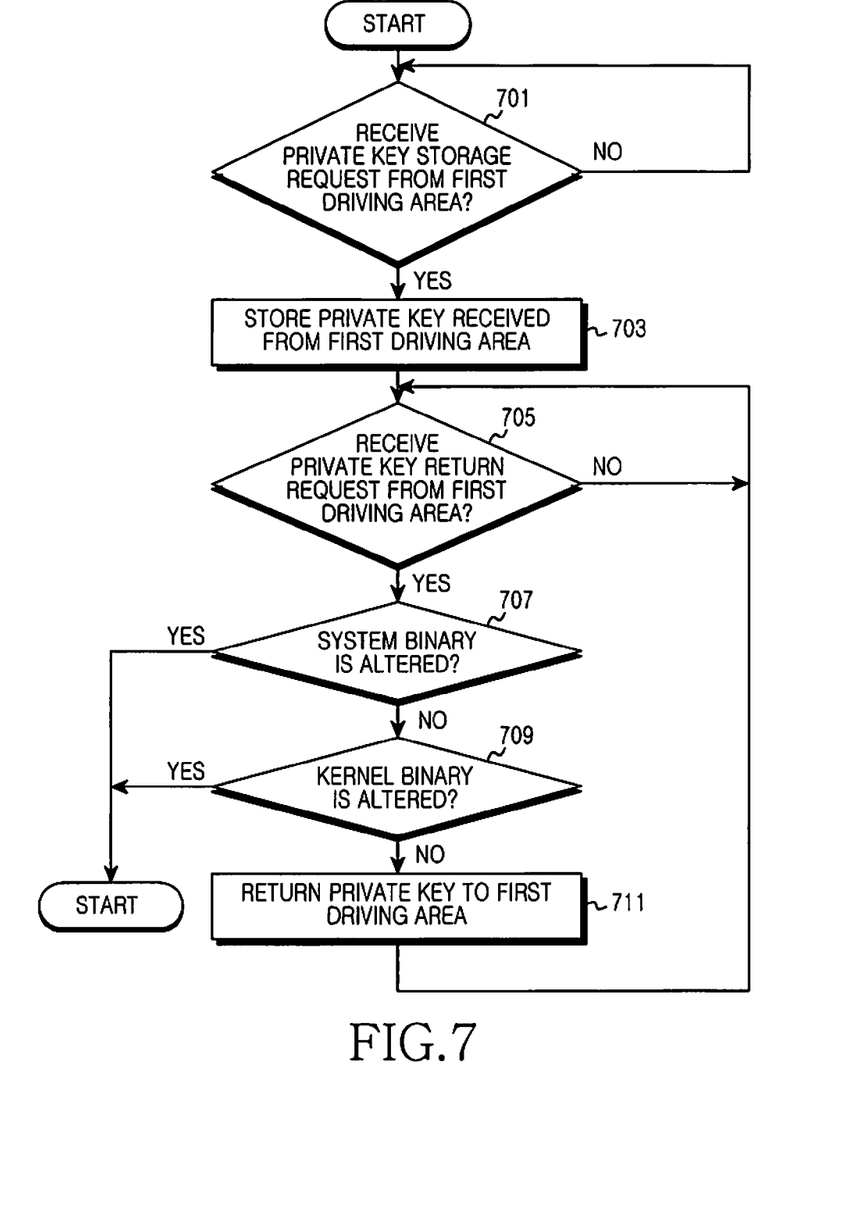
FIG. 7 illustrates a method for managing a private key in a security area of an electronic device according to an embodiment of the present disclosure.

FIG. 7 illustrates a method for managing the private key in the security area of the electronic device 100 according to another embodiment of the present disclosure.

Referring to FIG. 7, the electronic device 100 may determine whether the private key storage request is received from the first driving area 200 through the second driving area 210 in step 701. For example, the second driving area 210 of the electronic device 100 may determine whether the private key storage request signal for the application program requiring the security management is received from the first driving area 200.

Upon receiving the private key storage request from the first driving area 200, the electronic device 100 may store in the memory 130 the private key of the application program received from the first driving area 200 through the second driving area 210 in step 703. Thus, the second driving area 210 of the electronic device 100 may store the private key of the application program received from the first driving area 200, in the area accessible only by the second driving area 210 of the memory 130.

In step 705, the electronic device 100 may determine whether the private key return request is received from the first driving area 200 through the second driving area 210.

If the private key return request from the first driving area 200 is not received, the electronic device 100 may re-determine whether the private key return request is received from the first driving area 200 through the second driving area 210.

Upon receiving the private key return request from the first driving area 200, the electronic device 100 may determine whether the system binary is altered, through the second driving area 210 in step 707. For example, the second driving area 210 of the electronic device 100 may determine whether the system binary is altered by comparing the system binary measured at the booting of the electronic device 100 with the reference system binary. When a hash value of the system binary measured during booting of the electronic device 100 is different from the hash value of the reference system binary, the second driving area 210 of the electronic device 100 may recognize that the system binary is altered. The reference system binary is set to determine whether the electronic device 100 is hacked, at the fabrication of the electronic device 100, and may be updated through the firmware update.

When the system binary is altered, the electronic device 100 may recognize in the second driving area 210 that the electronic device 100 is hacked. Thus, the electronic device 100 may finish this process without returning the private key requested by the first driving area 200 through the second driving area 210.

When the system binary is not altered, the electronic device 100 may determine whether the kernel binary is altered, through the second driving area 210 in step 709. The second driving area 210 of the electronic device 100 may periodically measure the kernel binary of the electronic device 100. Accordingly, the second driving area 210 of the electronic device 100 may determine whether the kernel binary is altered by comparing the kernel binary measured on a periodic basis with a reference kernel binary. When the hash value of the kernel binary measured on a periodic basis is different from the hash value of the reference kernel binary, the second driving area 210 of the electronic device 100 may recognize that the kernel binary is altered. Thus, the reference kernel binary is set to determine whether the electronic device 100 is hacked, at the fabrication of the electronic device 100, and may be updated through the firmware update.

When the kernel binary is altered, the electronic device 100 may recognize in the second driving area 210 that the electronic device 100 is hacked. Thus, the electronic device 100 may finish this process without returning the private key requested by the first driving area 200 through the second driving area 210.

When the kernel binary is not altered, the electronic device 100 may recognize in the second driving area 210 that the electronic device 100 is not hacked. Thus, the electronic device 100 may send the private key of the application program requested by the first driving area 200, to the first driving area 200 through the second driving area 210 in step 711.

The apparatus (e.g., the electronic device running on the multiple operating systems) or the methods according to various embodiments of the present disclosure can be implemented in software, firmware, hardware, or in any combination thereof. At least part of the operations of the method can be conducted sequentially, repeatedly, or in parallel. Some operations can be omitted or new operations can be added.

As for the software, a non-transitory computer-readable storage medium can store one or more programs (software modules). One or more programs stored in the non-transitory computer-readable storage medium can be configured for execution by one or more processors of, for example, the electronic device 100 of FIG. 1. One or more programs can include instructions for controlling, for example, the electronic device 100 of FIG. 1, to execute the methods according to the embodiments of the present disclosure.

As set forth above, the electronic device manages the private key of the unsecure area in the security area of the processor logically or physically separated from the unsecure area of the processor which processes the user interface service, and thus enhances security of the data stored therein.

In addition, the electronic device can install the application program with the integrity based on the security state of the unsecure area identified in the security area.

While the disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. A method of an electronic device, comprising:
identifying a security state of a system binary loaded into a memory of the electronic device based on booting of the electronic device in a second operating system of the electronic device;
storing a private key received from a first operating system of the electronic device using the second operating system;
receiving a request for returning the private key from the first operating system using the second operating system;
determining whether a hash value of the system binary measured at the booting of the electronic device is equal to a hash value of a reference system binary using the second operating system; and
if the hash value of the system binary measured at the booting of the electronic device is equal to the hash value of the reference system binary, sending the private key in the second operating system to the first operating system based on the request from the first operating system,
wherein identifying the security state of the system binary comprises:
measuring the hash value of the system binary at the booting of the electronic device using the second operating system; and
storing the hash value of the system binary at the booting of the electronic device using the second operating system.

2. The method of claim 1, wherein the first operating system runs in a normal world, and
the second operating system runs in a secure world.

3. The method of claim 1, wherein the system binary includes one or more of a boot binary loaded by a bootloader of the electronic device and a kernel binary loaded by the bootloader.

4. The method of claim 1, further comprising sending security state information in the second operating system to the first operating system,
wherein sending security state information to the first operating system comprises:
determining the security state information based on the stored hash value of the system binary and the hash value of the reference system binary;
encrypting the security state information; and
sending the encrypted security state information to the first operating system.

5. The method of claim 4, wherein identifying the security state of the system binary comprises:
storing the determined security state information of the system binary.

6. The method of claim 5, wherein sending security state information to the first operating system comprises:
encrypting the stored security state information; and
sending the encrypted security state information to the first operating system.

7. The method of claim 4, wherein identifying the security state of the system binary comprises:
when the electronic device is booted, identifying service accessibility setting information via a kernel in the second operating system.

8. The method of claim 7, wherein sending security state information to the first operating system comprises:
determining the security state information based on the security state of the system binary and the service accessibility setting information via the kernel in the second operating system;
encrypting the determined security state information; and
sending the encrypted security state information to the first operating system.

9. An electronic device comprising:
a memory; and
at least one processors configured to drive a plurality of operating systems,
wherein the at least one processor is configured to:
identify a security state of a system binary loaded into a memory of the electronic device based on booting of the electronic device in a second operating system,
store a private key received from a first operating system of the electronic device using the second operating system,
receive a request for returning the private key from the first operating system using the second operating system,
determine whether a hash value of the system binary measured at the booting of the electronic device is equal to a hash value of a reference system binary using the second operating system, and
if the hash value of the system binary measured at the booting of the electronic device is equal to the hash value of the reference system binary, send the private key in the second operating system to the first operating system based on the request from the first operating system,
wherein the at least one processor is further configured to:
measure the hash value of the system binary at the booting of the electronic device using the second operating system, and
store the hash value of the system binary at the booting of the electronic device using the second operating system.

10. The electronic device of claim 9, wherein the first operating system runs in a normal world, and
the second operating system runs in a secure world.

11. The electronic device of claim 9, wherein the system binary at least one of a boot binary loaded by a bootloader of the electronic device and a kernel binary loaded by the bootloader.

12. The electronic device of claim 9, wherein the processor is configured to generate the hash value of the system binary using the second operating system, and to store the hash value of the system binary in the memory.

13. The electronic device of claim 12, wherein the memory stores the hash value generated using the second operating system in an area accessible only by the second operating system.

14. The electronic device of claim 12, wherein the processor is further configured to determine security state information based on the hash value of the system binary using the second operating system and the hash value of the reference system binary, to encrypt the determined security state information, and to send the encrypted security state information to the first operating system.

15. The electronic device of claim 14, wherein the memory stores the security state information of the system binary generated using the second operating system in an area accessible only by the second operating system.

16. The electronic device of claim 14, wherein, when the electronic device is booted using the second operating system, the processor is configured to identify service accessibility setting information via a kernel, to determine the security state information based on the security state of the system binary and the service accessibility setting information via the kernel, to encrypt the determined security state information, and to send the encrypted security state information to the first operating system.

* * * * *